United States Patent
Stauffer et al.

(10) Patent No.: US 10,642,594 B2
(45) Date of Patent: May 5, 2020

(54) SYSTEM AND METHOD FOR UPDATING MONITORING SOFTWARE USING CONTENT MODEL WITH VALIDITY ATTRIBUTES

(71) Applicants: Ralf Stauffer, Schwegenheim (DE); Steffen Siegmund, St. Leon-Rot (DE); Edgardo Gildo Koenig, Leimen (DE); Arndt Effern, Sinsheim (DE); Guenter Briam, Wiesloch (DE)

(72) Inventors: Ralf Stauffer, Schwegenheim (DE); Steffen Siegmund, St. Leon-Rot (DE); Edgardo Gildo Koenig, Leimen (DE); Arndt Effern, Sinsheim (DE); Guenter Briam, Wiesloch (DE)

(73) Assignee: SAP SE, Walldorf (DE)

( * ) Notice: Subject to any disclaimer, the term of this patent is extended or adjusted under 35 U.S.C. 154(b) by 116 days.

(21) Appl. No.: 14/550,020

(22) Filed: Nov. 21, 2014

(65) Prior Publication Data

US 2016/0147523 A1 May 26, 2016

(51) Int. Cl.
*G06F 8/65* (2018.01)
*G06F 16/245* (2019.01)
*G06F 16/23* (2019.01)

(52) U.S. Cl.
CPC ............ *G06F 8/65* (2013.01); *G06F 16/2365* (2019.01); *G06F 16/245* (2019.01)

(58) Field of Classification Search
CPC ........................................................ G06F 8/65
USPC ......................................................... 717/169
See application file for complete search history.

(56) References Cited

U.S. PATENT DOCUMENTS

| | | | | |
|---|---|---|---|---|
| 6,735,625 B1* | 5/2004 | Ponna | ..................... | H04L 67/34 704/220 |
| 7,382,765 B2* | 6/2008 | Kennedy | ............... | H04L 1/1685 370/351 |
| 8,352,934 B1* | 1/2013 | Borole | ...................... | G06F 8/65 709/222 |
| 9,002,805 B1* | 4/2015 | Barber | ............. | G06F 17/30303 707/692 |
| 2004/0186906 A1* | 9/2004 | Torrant | ................. | H04L 41/046 709/225 |
| 2005/0021560 A1* | 1/2005 | Yoon | ..................... | G09B 29/102 |
| 2006/0230389 A1* | 10/2006 | Moulckers | ............. | G06Q 10/06 717/127 |
| 2006/0248522 A1* | 11/2006 | Lakshminarayanan | ... | G06F 8/61 717/174 |

(Continued)

*Primary Examiner* — Chat C Do
*Assistant Examiner* — Bradford F Wheaton
(74) *Attorney, Agent, or Firm* — Buckley, Maschoff & Talwalkar LLC

(57) ABSTRACT

According to some embodiments, each of a plurality of computer systems to be monitored receives a monitoring solution agent code portion and a monitoring solution agent content portion, the monitoring solution agent code portion and monitoring solution agent content portion together forming a monitoring solution agent. The monitoring solution agent code portion and monitoring solution agent content portion may comprise a remote Monitoring Solution Agent that executes at the computer system to be monitored. According to some embodiments, monitoring solution agent content portion includes a data source layer, a data provider layer, a request layer, and a user interface layer.

17 Claims, 14 Drawing Sheets

(56) References Cited

U.S. PATENT DOCUMENTS

| | | | |
|---|---|---|---|
| 2008/0059631 A1* | 3/2008 | Bergstrom | H04N 7/17318 709/224 |
| 2008/0163183 A1* | 7/2008 | Li | G06F 8/456 717/149 |
| 2009/0019420 A1* | 1/2009 | Johnson | G06F 8/36 717/101 |
| 2009/0106266 A1* | 4/2009 | Donatelli | G06F 17/30905 |
| 2015/0070382 A1* | 3/2015 | Anderson | G06F 3/0487 345/619 |

* cited by examiner

SYSTEM AND METHOD FOR UPDATING MONITORING SOFTWARE USING CONTENT MODEL WITH VALIDITY ATTRIBUTES

BACKGROUND

A computer system may include applications that are released and able to run on various combinations of database systems, operating systems, virtualization layers and cloud services, such as Infrastructure-as-a-Service ("IaaS"). Various infrastructure components of the computer system may be instrumented and monitored to help keep business processes up and running. While a snapshot of current monitoring data may provide a relatively good impression of current system behavior, monitoring data history for a relatively long period of time may better help determine how the behavior of the computer system changes over time. For example, a monitoring data history of more than one year may be maintained, which might add up to several 100 Giga-Bytes ("GB") of raw data for various elements of the computer system. Moreover, a centralized monitoring solution may store monitoring data history for many different computer systems, which will further increase the amount of data that needs to be stored, and may also cause replicated events and alerts to occur. Keeping such a substantial amount of data may be expensive and increase the Total Cost of Ownership ("TCO") of computer systems. Further, attempting to install monitoring code locally at each computer system may be impractical if there is resistance to the idea of updating the monitoring code relatively frequently (to support changes that are made to database versions, operating systems, hardware, etc.). Still further, many different topologies may need to be supported, and an efficient and accurate method of doing so may be desired.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
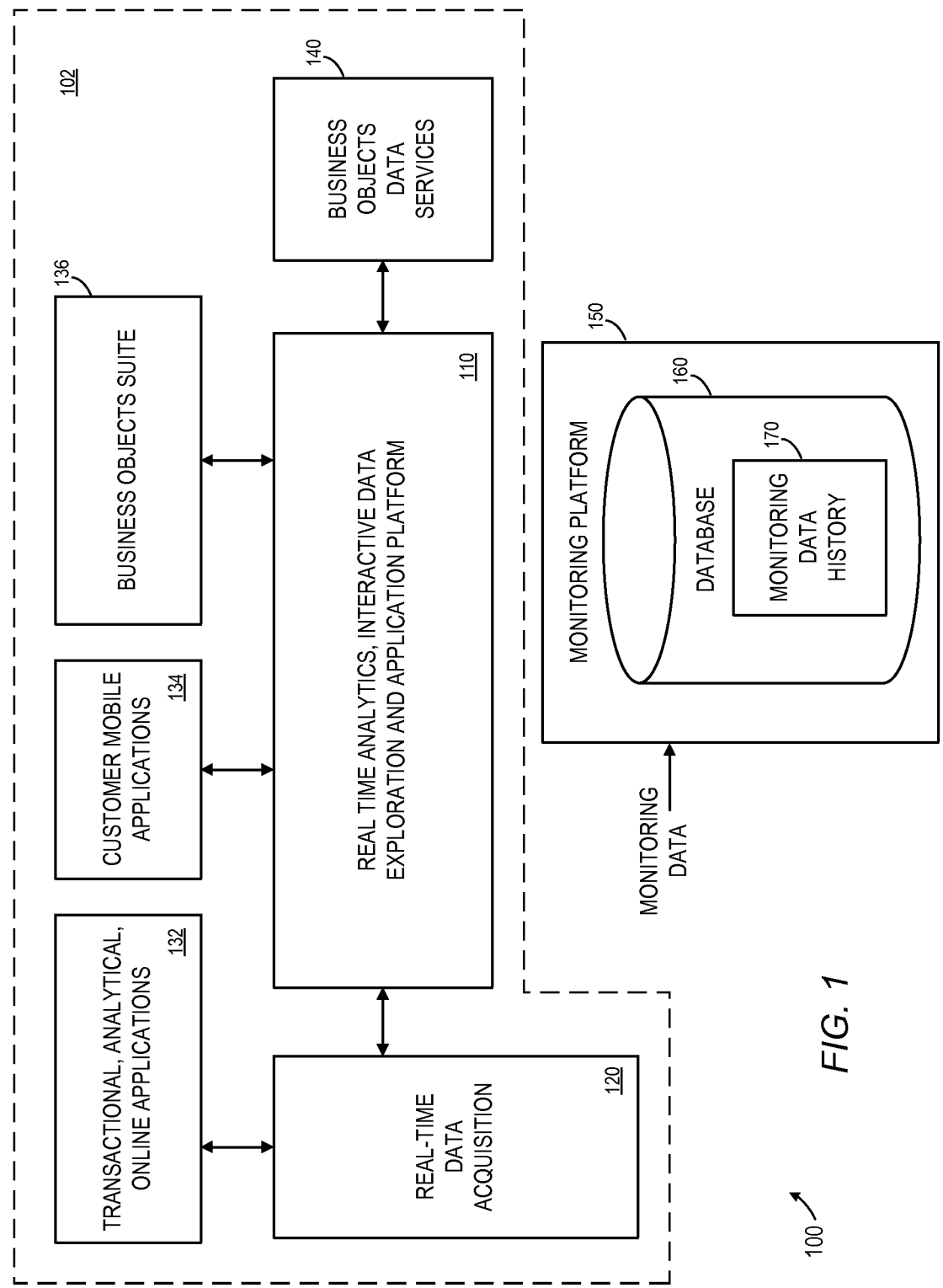
FIG. 1 is a block diagram of a computer system including a monitoring platform.

In some cases, a computer system may include applications that are released and able to run on various combinations of database systems, operating systems, virtualization layers and cloud services, such as IaaS. By way of example, only FIG. 1 is a block diagram of a computer system 100 including a computer system 102 to be monitored by a monitoring platform. The computer system 102 may include a real time analytics, interactive data exploration and application platform 110 that communicates with a real-time data acquisition device 120. The application platform 110 might be associated with, for example, the High-Performance ANalytic Appliance ("HANA") in-memory, column-oriented, relational database management system developed and marketed by SAP SE®. The application platform 110 may include, for example, an OnLine Analytical Processing ("OLAP") engine, a predictive engine, a spatial engine, and/or application logic and rendering. The real-time data acquisition device 120 may include landscape transformation, a replication server, and/or an event stream processor. According to some embodiments, the application platform 110 and/or real-time data acquisition device 120 may exchange information with transactional, analytical, online applications 132. The application platform may also exchange information with customer mobile applications 134 (e.g., associated with mobile platforms), a business object suite 136 (e.g., associated with exploration, reporting, dashboarding, predictive functions, and/or mobile versions) and/or business objects data services 140.

Various infrastructure components of the computer system 102 may be instrumented and monitored to help keep business processes up and running. While a snapshot may provide a relatively good impression of current computer system 102 behavior, the monitoring platform 150 may receive monitoring data and store information into a storage unit 160 as monitoring data history 170 for a relatively long period of time to better determine how the behavior of the computer system 100 changes over time. For example, a monitoring data history 170 of more than one year may be maintained, which might add up to several 100 GB of raw data for various elements of the computer system 100. Keeping such a substantial amount of data, however, may be expensive and increase the TCO of the system 100.

Figure 2:
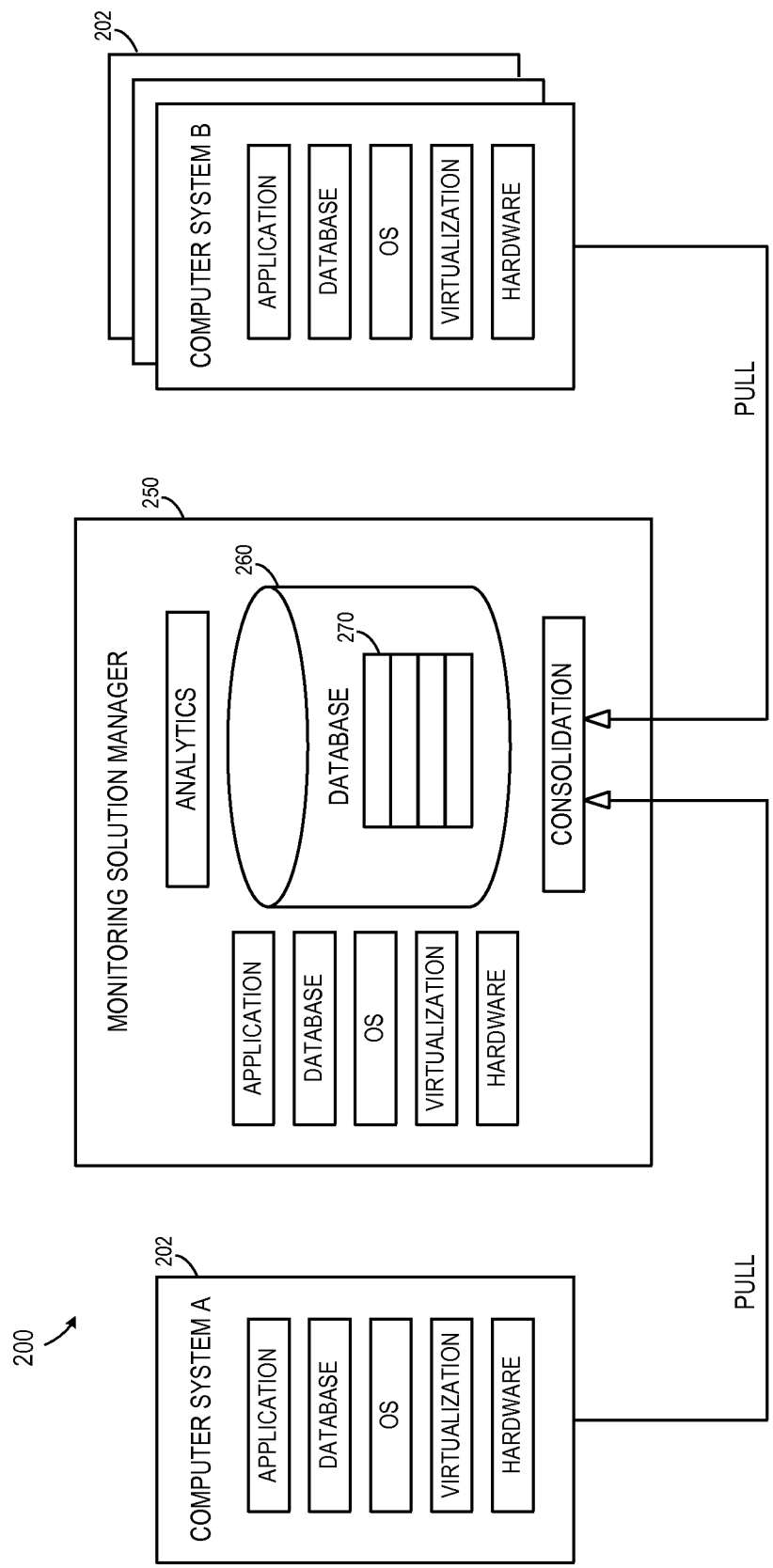
FIG. 2 illustrates a system wherein multiple computer systems may be monitored by a monitoring solution manager.

Further note that a centralized monitoring solution may store monitoring data history for many different computer systems, which will further increase the amount of data that needs to be stored, and may also cause replicated events and alerts to occur. For example FIG. 2 illustrates a system 200 wherein multiple computer systems 202 (e.g., labeled computer system A, computer system B, etc.) may be monitored by a monitoring solution manager 250. Each computer system 202 may include infrastructure components (e.g., associated with applications, databases, operating systems, virtualization, and/or hardware) that are instrumented to allow monitoring to keep business processes up and running. Vendor monitoring tools, however, typically focus on individual stack components, whereas an integrated view of all applications and stack components may be desired to localize and analyze problems in complex environments.

The monitoring solution manager 250 may regularly collect monitoring data of applications and the underlying technology stack components within multiple system landscapes. The collected data may be stored in a central database 260 and consolidated into data providers (InfoCubes 270) that may be optimized for reporting. Data from such unified providers may then be processed by landscape administrators to localize and analyze problems. Thus, as illustrated in FIG. 2, data replication and monitoring may be achieved by pulling and extracting data regularly from local computer systems 202 and the underlying technology stacks. The duplicated data may be consolidated at the monitoring solution platform and persisted in the central database 260 where it may be accessed by an end-user.

The computer system 202 may simply provide Application Programming Interfaces ("APIs") to allow access to raw data. Knowledge about data models and analytic capabilities may be implemented as part of the monitoring solution manager, which may also control the scheduling mechanism for regular data collection.

Note that persisting historic data in the central database 260 may have several disadvantages. Setting up and maintaining a stable data replication process is complex, and duplicating may GBs of monitoring data increases the TCO of running the system 200 landscape.

Figure 3:
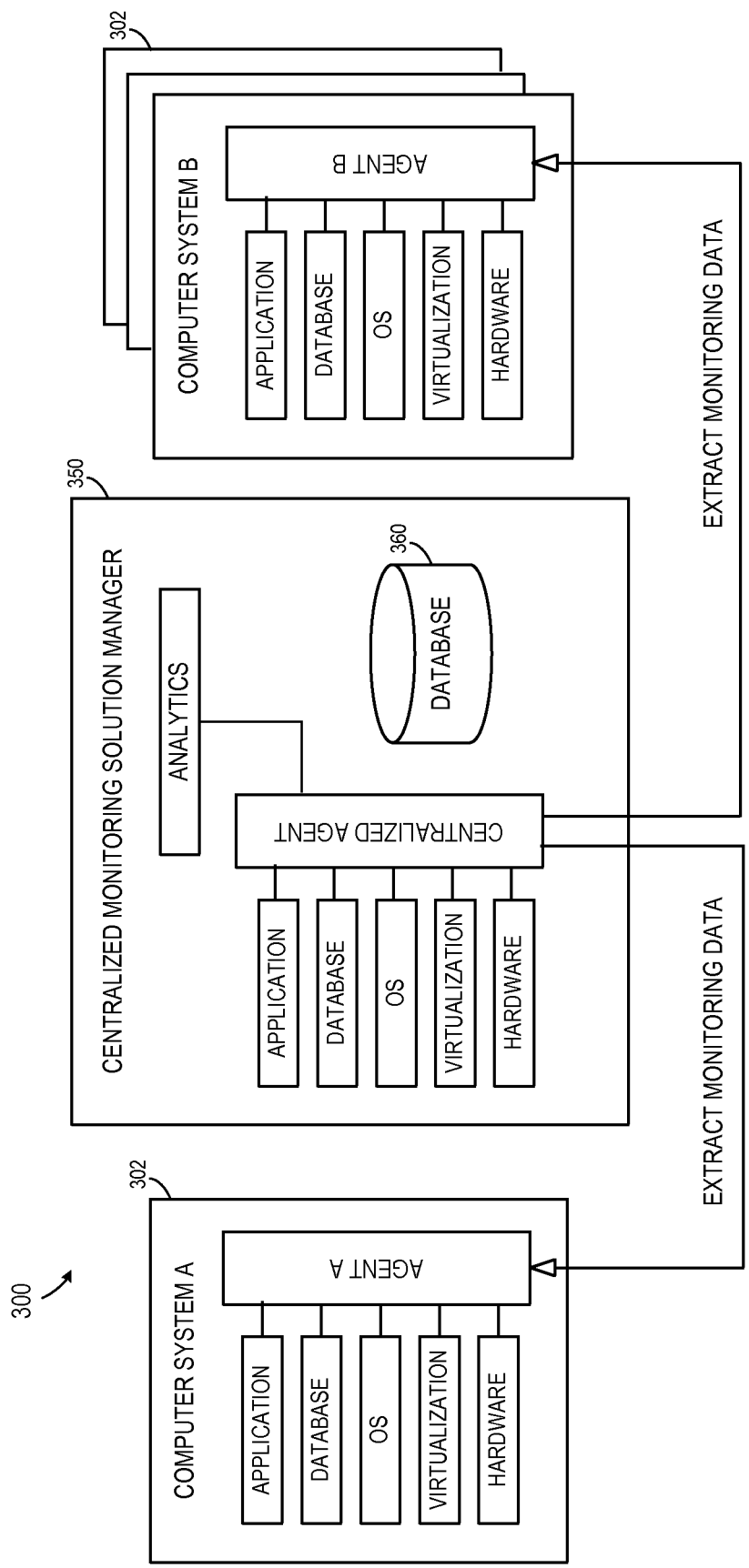
FIG. 3 illustrates a system wherein a monitoring solution manager deploys content to be tailored by monitoring agents at multiple computer systems.

One approach to reduce data redundancy, and still allow an integrated view on local applications and underlying stack components, may move knowledge about data models and analytic capabilities into an "agent." FIG. 3 illustrates a system 300 wherein a monitoring solution manager 350 deploys content to be tailored by monitoring agents at multiple computer systems 302. These agents may include code components which were part of, and delivered with, a business application or a run time environment.

According to some embodiments, an agent is able to automatically detect the topology (application and infrastructure) of the local computer system 302. The topology information together with the data models of underlying infrastructure components may then be used to build up unified data providers at run time. These data providers may be, for example, accessed externally through web service calls, and the analytic capabilities of the agents may allow slice and dice capabilities through the data provided. This approach moves away from a centralized store to a non-centralized store, where OLAP capabilities (data consolidation, externalization, and processing) may be shifted from the centralized monitoring solution manager 350 into the local computer systems 302 without data replication.

For example, assume that a local computer system is running on an SAP® HANA® database in an Azure® cloud. The local agent at the computer system 302 detects the current topology and builds up a run time with the help of data models that externalize appropriate data providers (e.g., HANA®, Windows®, and HyperV® monitoring data). These data providers may allow access via oData calls, which are locally processed and transformed into queries against the underlying stack components using SQL, web services or other query languages.

In order to preserve the monitoring capabilities of the solution manager 350, analytic requests against the central database 360 may be instantly translated into web service calls targeting the local computer systems 302. An agent within the solution manager 350 may act as a proxy to redirect these requests. As a result, replication of events, alerts, and monitoring data into the solution manager 350 may be avoided and the data is retrieved from each computer system 302 local stack as needed.

Note, however, that the agents at each computer system 302 may need to be updated from time to time so that they support the latest infrastructure component versions, such as new database and operating system versions. Agent updates may also be needed when external data consumers, such as the solution manager 350, require changes to data providers or data processing (data requests). The release and support cycles of infrastructure components and external data consumers might not be synchronized with the release and support cycles of other application. Keeping the local agents at each computer system 302 functionally synchronized with continually changing environments is therefore an ambitious task.

Although agent updates might be shipped in form of code support packages, customers operating the computer systems 302 may dislike code changes, such as when legal regulations require thorough (and thus expensive) tests before the changes can be applied productively. As a result, upgrading a software stack just to enable new infrastructure components may cause customers to hesitate. Moreover, single code corrections may not be an appropriate alternative to support cumulative code corrections because such single code corrections are not intended to resolve complex or stacked code modifications. As a result, the support infrastructure of the installed agents at the computer systems 302 may fall behind over time, with a potentially negative impact on the supportability of the computer systems 302.

Figure 4:
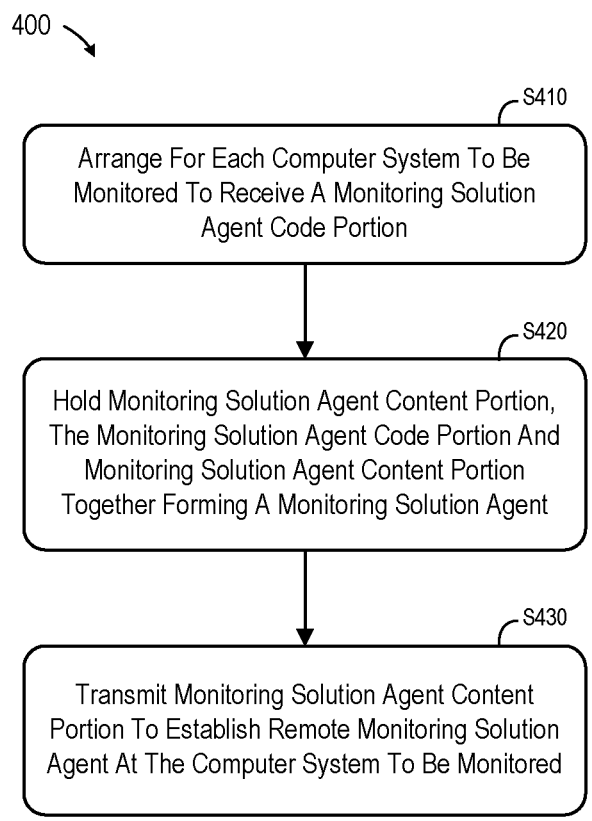
FIG. 4 is a flow diagram of a central monitoring solution manager method according to some embodiments.

To avoid such problems, FIG. 4 comprises a flow diagram of a method or process 400 according to some embodiments. The method 400 of FIG. 4 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Further note that the steps of the methods described herein may be performed in any order that is practical.

At S410, it may be arranged for a monitoring solution agent code portion to be provided to each of a plurality of remote computer systems to be monitored. As used here, the phrase "computer systems" might refer to, for example, systems that include a database system, an operating system, a virtualization layer, a cloud service, an infrastructure as a service platform, a real-time analytics, interactive data exploration and application platform, a real time data acquisition platform, a transactional, analytical, online application, a customer mobile application, a business object suite, and/or a business objects data service. The monitoring solution agent code portion may be provided to computer systems along with business application or a run time environment and may comprise, for example, a content management and interpretation engine and include topology data (at run time, while at design time it may include code for topology detection and/or discovery), system data, connections data (at run time, while at design time it may include code needed to connect to local infrastructure components and/or applications), a user interface framework, a request controller, and/or a request processor to communicate with a monitored computer system.

At S420, a centralized monitoring solution manager, coupled to a communication device adapted to communicate with the plurality of remote computer systems, may hold (e.g., receive and store) a monitoring solution agent content portion for the remote computer systems to be monitored. The monitoring solution agent code portion and monitoring solution agent content portion together may form a monitoring solution agent. The monitoring solution agent content portion may include, for example, navigation information, user interface information, personalization information (e.g., including roll based customizing and/or customization performed by an end user), a data provider, a data source, mapping data, request data, aggregation data, thresholds, calculations, collector information, database metadata, operating system metadata, and/or platform specific metadata. Note that the monitoring solution agent code portion may make use of a content manager to tailor and deploy the monitoring solution agent content portion.

At S430, the centralized monitoring solution manager may transmit the monitoring solution agent content portion to establish a remote monitoring solution agent at each computer system to be monitored. Note that according to any of the embodiments described herein, the content portion may instead be received via any other download area (e.g., a download marketplace on the web). According to some embodiments, the centralized monitoring solution manager may also locally create a centralized monitoring solution agent. In this case, a monitoring request may be transmitted from the local centralized monitoring solution agent to one of the remote monitoring solution agents established at the computer systems to be monitored.

Subsequently, the centralized monitoring solution manager may determine a change that may be associated with one or more of the computer systems being monitored (e.g., a new database version has been released). According to some embodiments, the solution manager may recognize that there is a new agent content version available in a download area (and development of new agent content versions may be triggered by a new versions of the monitored infrastructure components). In this case, the centralized monitoring solution manager may update, based on the change, the monitoring solution agent content portion for the computer systems to be monitored, and transmit the updated monitoring solution agent content portion to each of the computer systems (either directly or via a download marketplace on the web). The change might be associated with, for example, hardware, virtualization, an operating system, a database, and/or an application. In this way, the content portion may be used to facilitate updates to the remote monitoring solution agents. Note that content updates are an alternative to code changes and may include a description of objects, attributes, and their dependencies.

In a non-centralized scenario, as described with respect to FIG. 3, remote agents may have full control over the whole stack of the monitoring solution: data sources, data provider, data requests, and user interfaces. These may allow for a content driven monitoring solution wherein local agents may be updated without changing code in the software stack. Therefore, major parts of the monitoring agent's logic may be converted into descriptive content, which makes the remaining code base of the monitoring agents quite slim.

Figure 5:
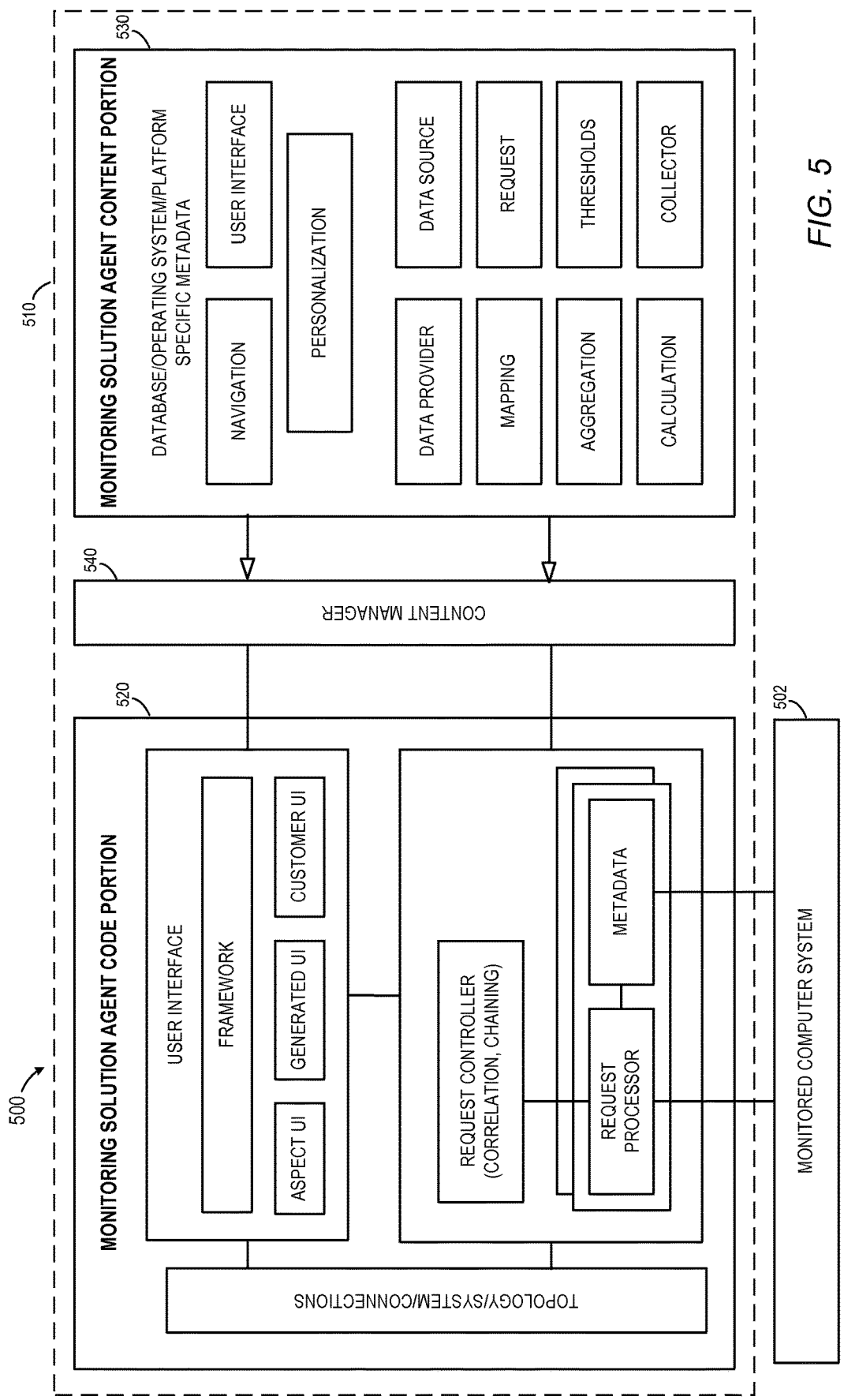
FIG. 5 is a block diagram of monitoring agent components in accordance with some embodiments.

FIG. 5 is a block diagram of system wherein a monitoring agent 510 monitors a computer system 502 in accordance with some embodiments. In particular, the monitoring agent 510 may include a monitoring solution agent code portion 520 that makes use of a content manager 540 to tailor and deploy a monitoring solution agent content portion 530 to facilitate monitoring of the computer system 502. The agent code portion 520 may comprise a simple content management and interpretation engine. The content portion 530 may describe the objects of the monitoring solution along with dependencies. Both the agent portion 520 and content portion 530 build up the monitoring solution agent 510 at run time. The descriptive content portion 530 is a convex hull that contains descriptions for each possible software component version (including components that may not be present at a particular computer system being monitored). For example, software components may comprise SYBASE® ASE or SUSE LINUX® whereas SYBASE ASE® V16 and SUSE LINUX® SLES 11 may represent software component versions. The content manager 540 may interpret and manage content at run time to establish a tailored monitoring solution, which depends on the topology and infrastructure components of the monitored computer system 502.

Figure 6:
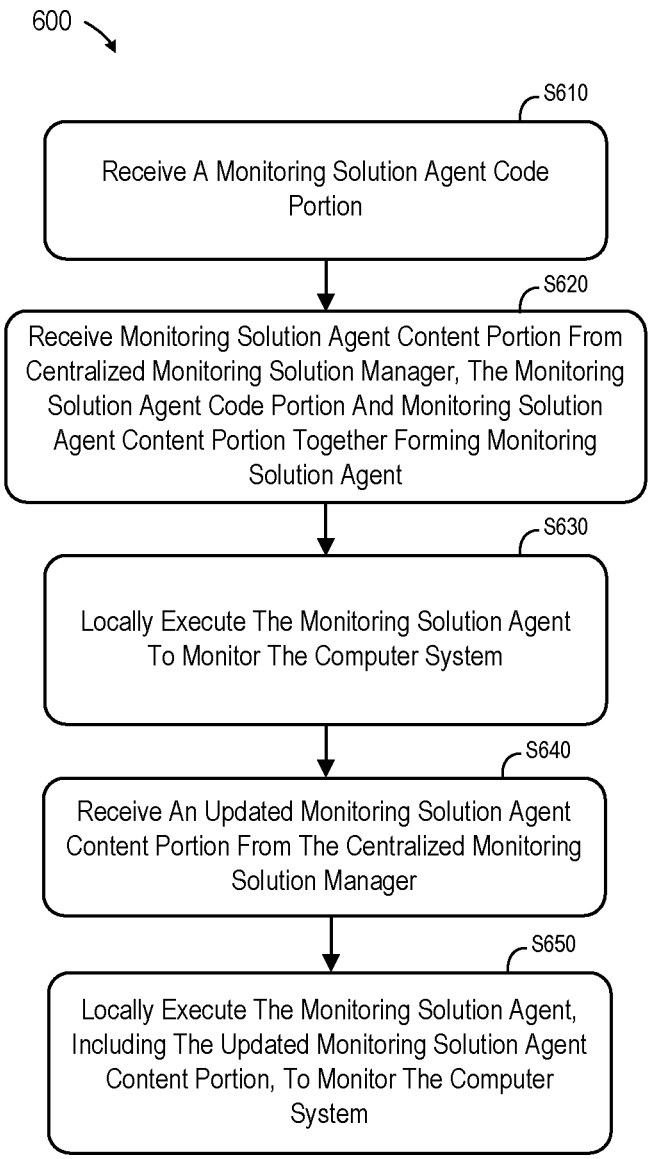
FIG. 6 is a flow diagram of a local monitoring method at a computer system according to some embodiments.

FIG. 6 is a flow diagram of a local monitoring method 600 at a computer system according to some embodiments. In some embodiments, the one of the computer systems 302 of FIG. 3 executes program code to perform the method 600. At S610, a monitoring solution agent code portion may be received. For example, a local monitoring system at a computer system may receive the agent code portion along with a run time environment.

At S620, a monitoring solution agent content portion may be received from a centralized monitoring solution manager. Note that the content portion may be received directly from the solution manager or may be received via any other download area (e.g., such as a download marketplace on the web). The monitoring solution agent code portion and monitoring solution agent content portion together may form a Monitoring Solution Agent. At S630, the monitoring solution agent may be locally executed to monitor the computer system. For example, the solution agent may detect of the topology of the local system and utilize the appropriate portions of the content portion. In this way, the engine or code portion of the agent may execute using the existing run time environment and there is no need to deploy a new or additional environment to support the local agent. As a result, the setup and maintenance of the agent may be as simple and stable as possible for end users.

At S640, an updated monitoring solution agent content portion may be received directly from the centralized monitoring solution manager or any other download area (e.g., such as a download marketplace on the web). The updated monitoring solution agent content may be associated with a change in, for example, hardware, virtualization, an operating system, a database, and/or an application of the computer system to be monitored (or another computer system). At S650, the monitoring solution agent, including the updated monitoring solution agent content portion, may be locally executed to monitor the computer system as appropriate in view of the change reflected in the updated agent content portion. According to some embodiments, the local monitoring system may receive a monitoring request from the remote centralized monitoring solution agent. The local monitoring system may then transmit, to the remote centralized monitoring solution agent, a monitoring response to the monitoring request.

Figure 7:
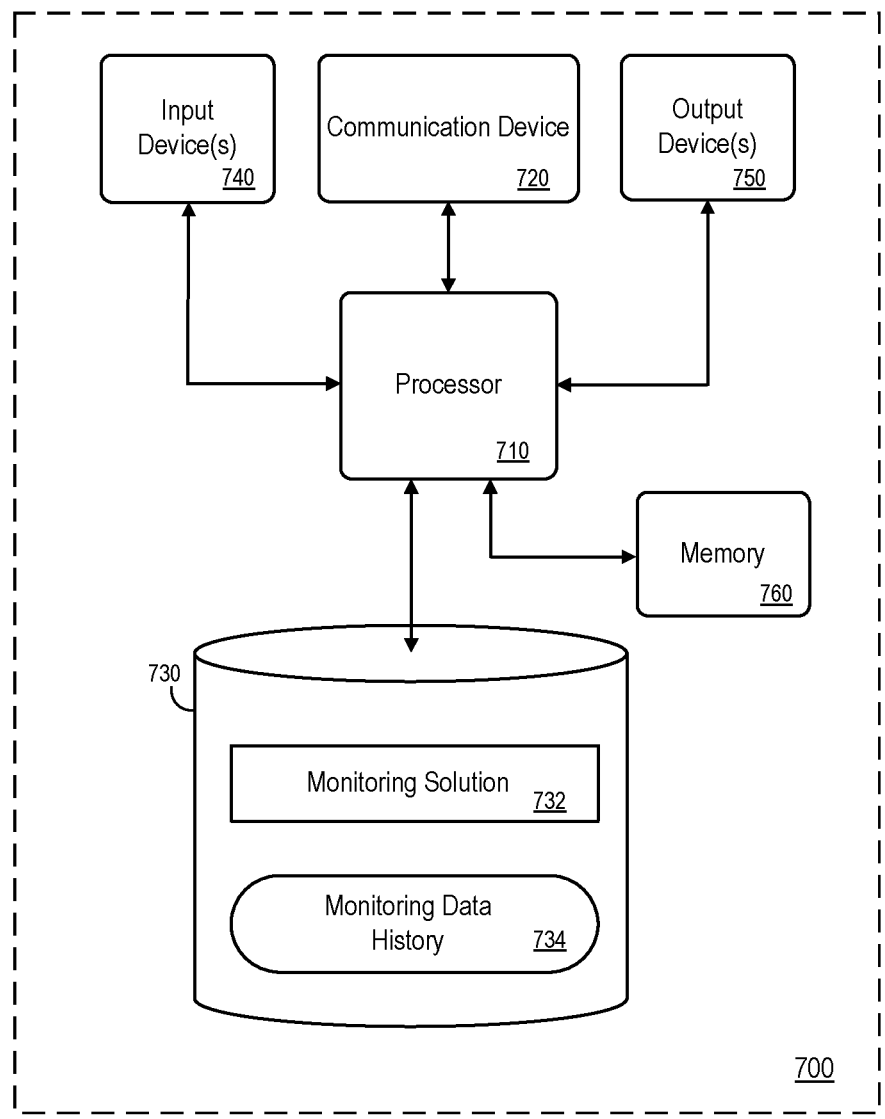
FIG. 7 is a block diagram of a monitoring apparatus according to some embodiments.

Note that embodiments of a monitoring system may be implemented in any of a number of different ways. For example, FIG. 7 is a block diagram of a monitoring apparatus 700 according to some embodiments. The apparatus 700 may comprise a general-purpose computing apparatus and may execute program code to perform any of the functions described herein. The apparatus 700 may include other unshown elements according to some embodiments.

The apparatus 700 includes a processor 710 operatively coupled to a communication device 720, a data storage device 730, one or more input devices 740, one or more output devices 750, and a memory 760. The communication device 720 may facilitate communication with external devices, such as a reporting client, a data storage device, a centralized monitoring solution manager and/or elements of a computer system being monitored. The input device(s) 740 may comprise, for example, a keyboard, a keypad, a mouse or other pointing device, a microphone, knob or a switch, an Infra-Red ("IR") port, a docking station, and/or a touch screen. The input device(s) 740 may be used, for example, to enter information into the apparatus 700 such as configuration information, monitoring thresholds, report generation requests, etc. The output device(s) 750 may comprise, for example, a display (e.g., a display screen) a speaker, and/or a printer to output information, such as monitoring data history reports.

The data storage device 730 may comprise any appropriate persistent storage device, including combinations of magnetic storage devices (e.g., magnetic tape, hard disk drives and flash memory), optical storage devices, Read Only Memory ("ROM") devices, etc., while the memory 760 may comprise Random Access Memory ("RAM").

A monitoring solution 732 may comprise program code executed by processor 710 to cause apparatus 700 to perform any one or more of the processes described herein, including those performed by a centralized monitoring solution manager and a local monitoring system or apparatus at a computer system to be monitored. Embodiments are not limited to execution of these processes by a single apparatus. The monitoring data history 734 may be stored, for example, in a columnar database. The data storage device 730 may also store data and other program code for providing additional functionality and/or which are necessary for operation of apparatus 700, such as device drivers, operating system files, etc.

Figure 8:
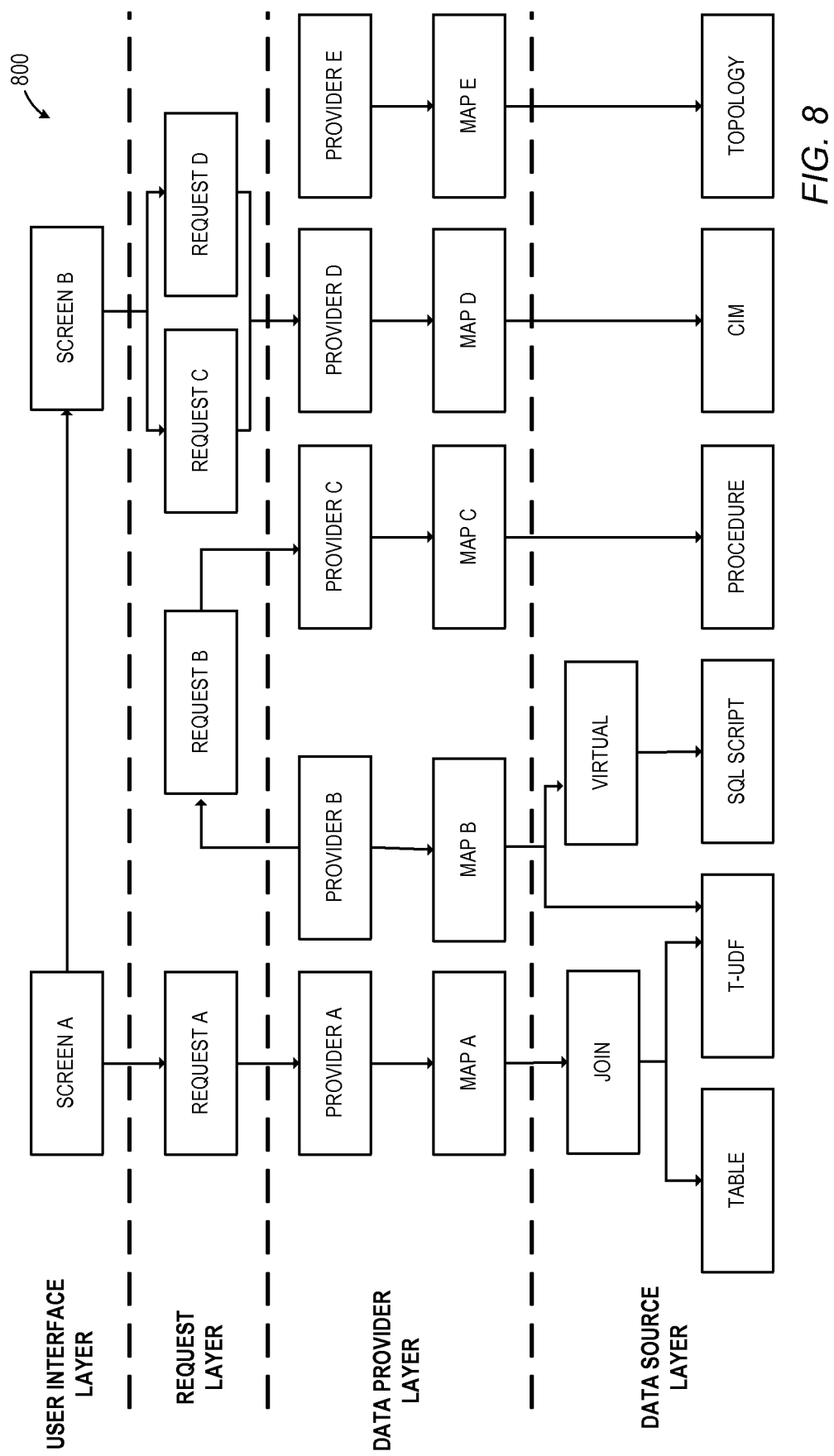
FIG. 8 illustrates content modeling layers in accordance with some embodiments.

According to some embodiments, a content portion for a monitoring agent may be organized by software components, each consisting of four content layers: data sources, data providers, requests and user interfaces. For example, FIG. 8 illustrates content modeling layers 800 in accordance with some embodiments. The data source layer may be associated with an entry point for monitoring data. The data source layer may describe the interfaces to infrastructure components that are to be monitored. Note that common interface types may include a table, a Table-User Defined Function ("T-UDF"), a stored procedure, and functions for databases. According to some embodiments, Common Information Model ("CIM") providers and web services are used for the operating system. Other interfaces may be used to discover system topology. The data sources may be mapped to data providers, which are the internal data provider layer. The data providers may be accessed by queries, which define the request layer. Requests may be linked to screens and user interface elements which define the front end user interface layer of the monitoring solution.

Figure 9:
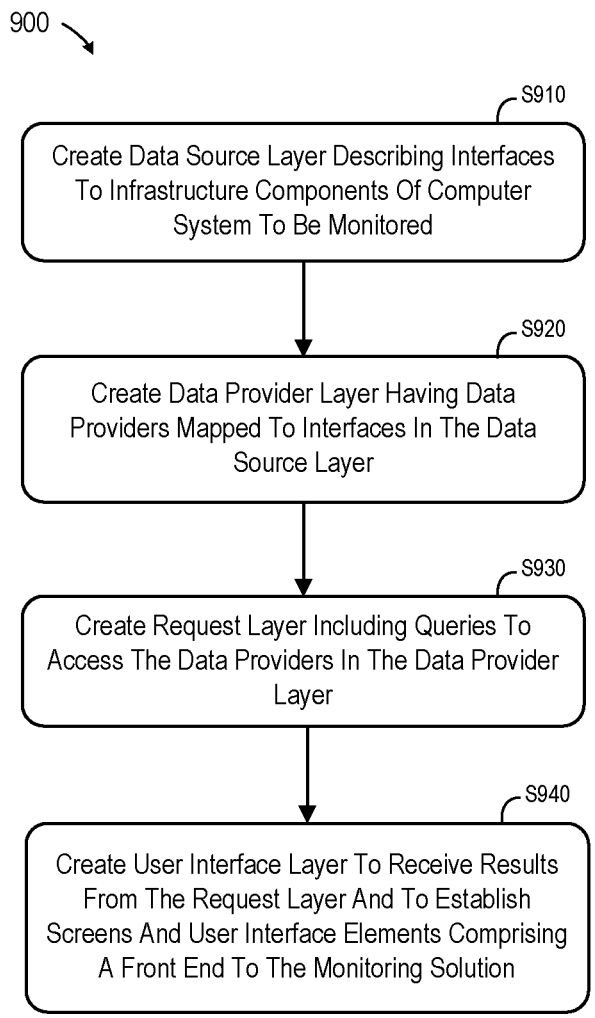
FIG. 9 is a flow chart of a monitoring agent content portion creation method according to some embodiments.

FIG. 9 is a flow chart of a monitoring agent content portion creation method 900 according to some embodiments. In particular, at S910 a data source layer may be created to describe interfaces to infrastructure components of the computer system to be monitored. At S920, a data provider layer may be created having data providers mapped to interfaces in the data source layer. At S930, a request layer may be created including queries to access the data providers in the data provider layer. At S940, a user interface layer may be create to receive results from the request layer and to establish screens and user interface elements comprising a front end to the monitoring solution.

Note that having a four layer content model for each software component as described in accordance with some embodiment may provide several advantages. For example, such a content model may result in flexible data modelling and encapsulation. That is, technical changes of the data source layers might not be recognized in the request or user interface layer. Moreover, a separation of concerns may result in a development team A working on software component A might avoid interfering with development team B working on software component B. Still further, a stable content build process may be established such that content errors of software component A will not break the content build process for software component B, etc. In addition, a defined sequence for the content build process may require that: data providers need data sources, requests need data providers, and the user interface needs requests before being defined. Structuring the content into four layers, bottom-up, may help resolve those dependencies during the build process.

By separating agents into an engine and content components, embodiments may allow the monitoring solution to be updated without code changes at any time. Note that the thin code or engine portion of an agent may provide affordable portability to other run time environments, such as a Java stack, where previously written content may be re-used in the new environment.

Figure 10:
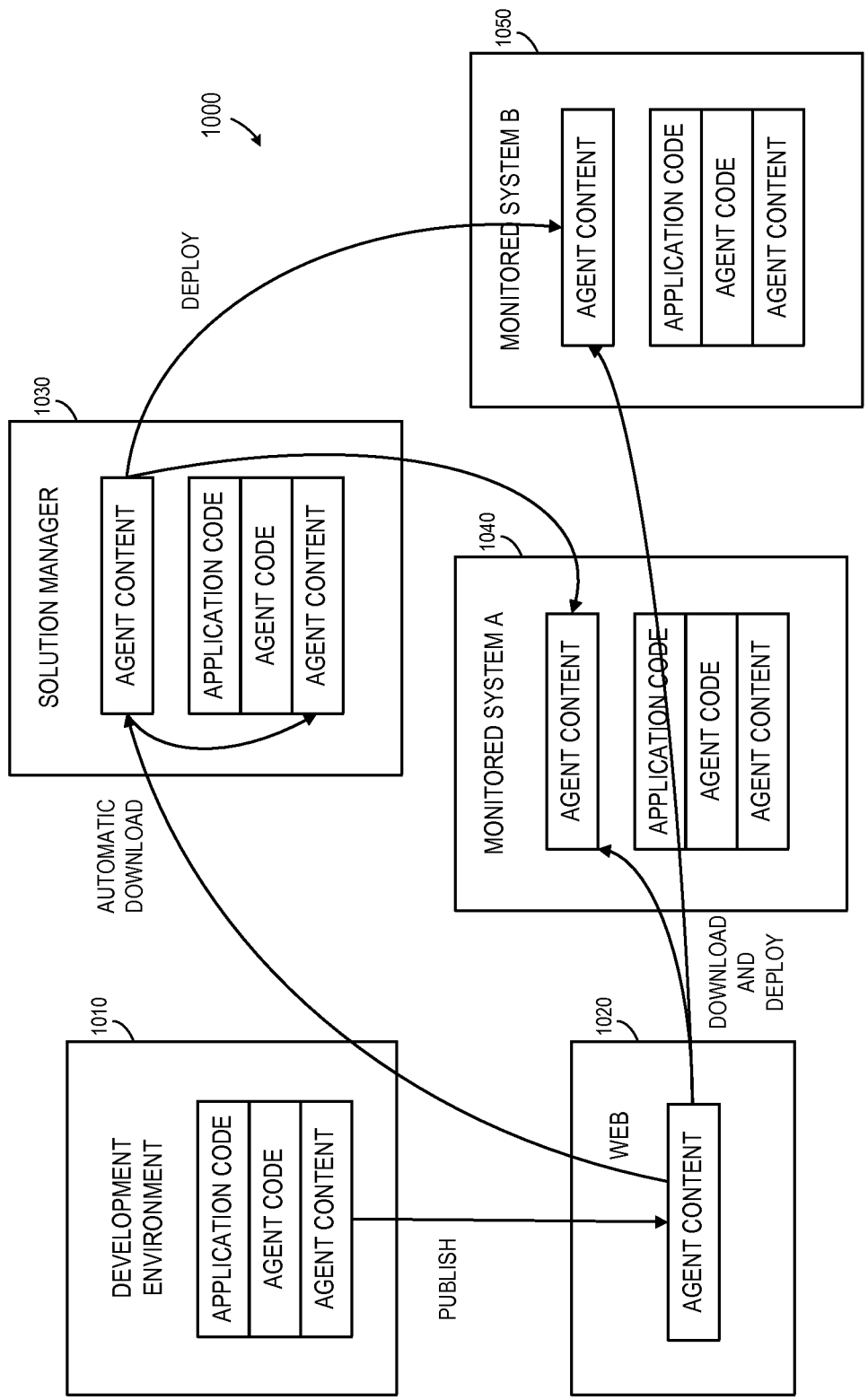
FIG. 10 illustrates content code and a content life cycle in accordance with some embodiments.

FIG. 10 illustrates content code and a content life cycle 1000 including a development environment 1010, downloads, and distribution of agent content parts. The development environment 1010 may, according to some embodiments, include application code, agent code, and agent content that may be created for customers. In some embodiments, the development environment 1010 may send these elements to a solution manager 1030 and/or monitored systems 1040, 1050 via traditional methods (e.g., along with a business applications and/or a run time environment).

According to some embodiments, content may either be automatically downloaded via the web 1020 and deployed to local monitored systems 1040, 1050 by the solution manager 1030 or downloaded and deployed "manually" by administrators. Once the new content is deployed to a local monitored system 1040, 1050, activating the new content in the local monitored system 1040, 1050 may comprise a manual/intended step that needs to be executed by administrators. For example, a popup window might state that "New content version is available. Activate new content version?" in which case, the administrator might select "Yes" or "No" as desired.

The convex content may be developed for customers at design time and then provided for download via a marketplace web site. Note, however, that when a new application support package (e.g., containing cumulative code changes) is delivered via a standard code delivery channel, the latest convex agent content may be bundled to it (e.g., just table entries) to ensure that each local monitored system 1040, 1050 has at least one agent content part available "out of the box." Further note that both customers and support representatives may use the same monitoring solution and it may be desirable to provide support at any time without delay.

The agent content part that is bundled with application support packages might not be active after the support package is applied. Instead, it may need to be activated manually (in a similar manner as described with respect to downloaded content). Because customers may be reluctant to apply the latest application support packages, the agent content part that is bundled with support packages might already be outdated when it reaches the local monitored systems 1040, 1050. Customers may therefore not activate the agent content part that is bundled with support packages, because the local monitored systems 1040, 1050 may already have newer content versions downloaded from the web 1020 (e.g., automatically by the solution manager 1030 or manually by an administrator). That is, the agent content part that is bundled with support packages may comprise a fall back option for support personnel.

Note that major parts of an agent's logic may be included in the descriptive content, and a content manager of an agent may interpret and manage content at run time to establish tailored monitoring solution for the solution manager 1030 and local monitored systems 1040, 1050. Moreover, the solution may depend on the topology of the monitored systems 1040. To realize such a solution, some embodiments described herein may: allow assignment of validity ranges to individual content objects at design time; discover the topology of the system in which content is going to be deployed; and/or facilitate a fast and safe evaluation of content validity ranges to determine content objects appropriate in view of the captured environment at run time.

Figure 11:
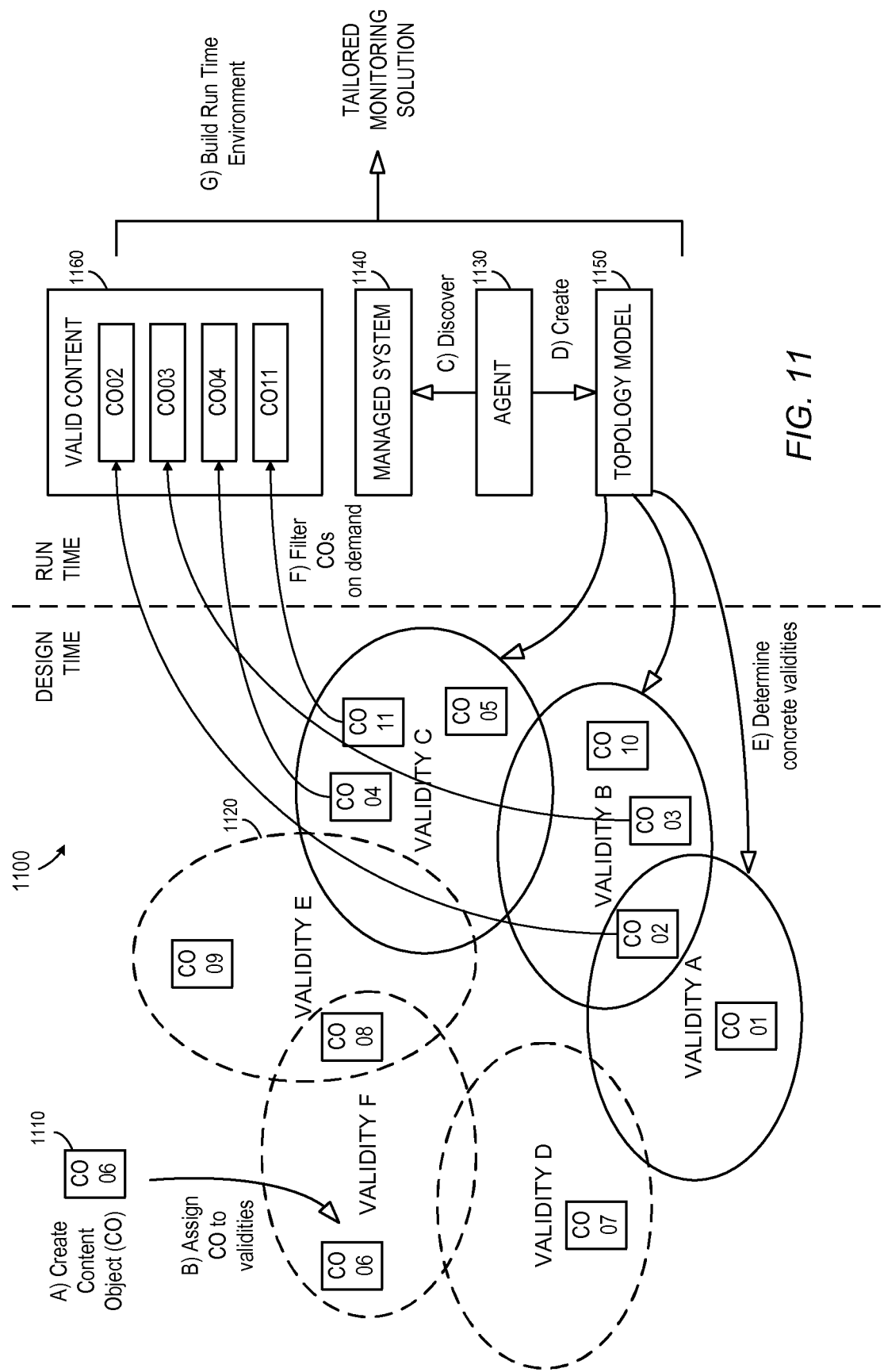
FIG. 11 is a system illustrating some of the steps associated with the building of a tailored monitoring solution in accordance with some embodiments.

FIG. 11 is a system illustrating some of the steps 1100 associated with the building of a tailored monitoring solution in accordance with some embodiments. In initially, a set of Content Objects 1110 (e.g., CO01 through CO11) are created and each is assigned to a validity 1120 (e.g., A through F) at design time as appropriate. Note that the creation of content at design time may take into account a large variety of local conditions in which content is supposed to be then deployed. Moreover, not all content objects will match all local conditions. A mechanism may therefore be provided to tag content objects for the appropriate environmental conditions for which they apply. To provide such a mechanism, the validity range 1120 per content object 1110 is defined (A) and (B) at design time. A validity range 1120 might, for example, include a number of valid software components 1110, a number of valid software component versions, and/or minimum agent version requirements. Examples of software components might include ASE or LINUX, for instance, while ASE V16 and LINUX SLES 11 might represent software component versions. Note that multiple content objects 1110 can share the same validity range 1120 (e.g., CO04, CO05, and CO11 are all assigned to validity C in FIG. 11) and vice versa (that is, a content object may belong to more than one environment and there may be a n:m relationship between environments and content objects).

Before any content object can be used in a target system 1140, the topology 1150 of the target system 1140 may be discovered at (C) by an agent 1130. The derived topology model 1150 comprises a basis to generate a tailored monitoring solution at run time. Using the topology model created at (D), concrete validities may be determined at (E), which can then be used to evaluate all content objects 1110 to define a subset of content objects appropriate for the target topology (e.g., illustrate by the validities 1120 having solid lines in FIG. 11). These selected (e.g., valid) content objects 1160 together with the agent 1130 form the run time of the tailored monitoring solution. According to some embodiments, a list of validity identifiers may be buffered in memory and used as a fast filter for content objects 1110 such that content objects 1110 are only loaded into memory on demand (e.g., when a new data request is issued or a new user interface screen is loaded).

Figure 12:
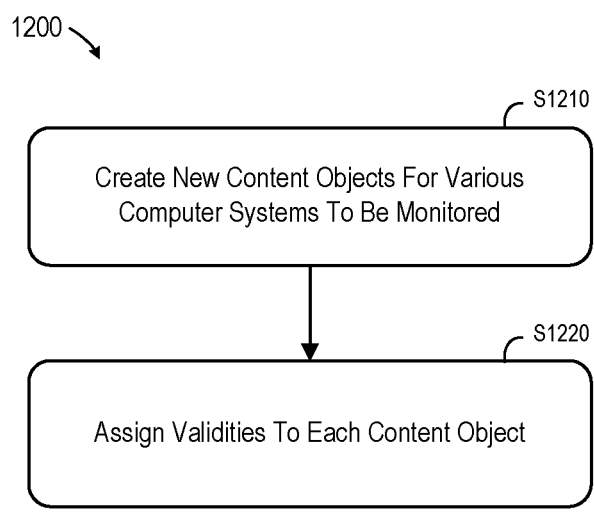
FIG. 12 is a flow diagram of a build time method in accordance with some embodiments.

FIG. 12 is a flow diagram of a build time method 1200 that may be performed in a development environment in accordance with some embodiments. At S1210, a set of new content objects may be created. At S1220, validities may be assigned to content objects as appropriate. The content objects and validities may be associated with, for example, agent content portions that may be distributed to computing systems to be monitoring according to any of the embodiments of FIG. 10.

Figure 13:
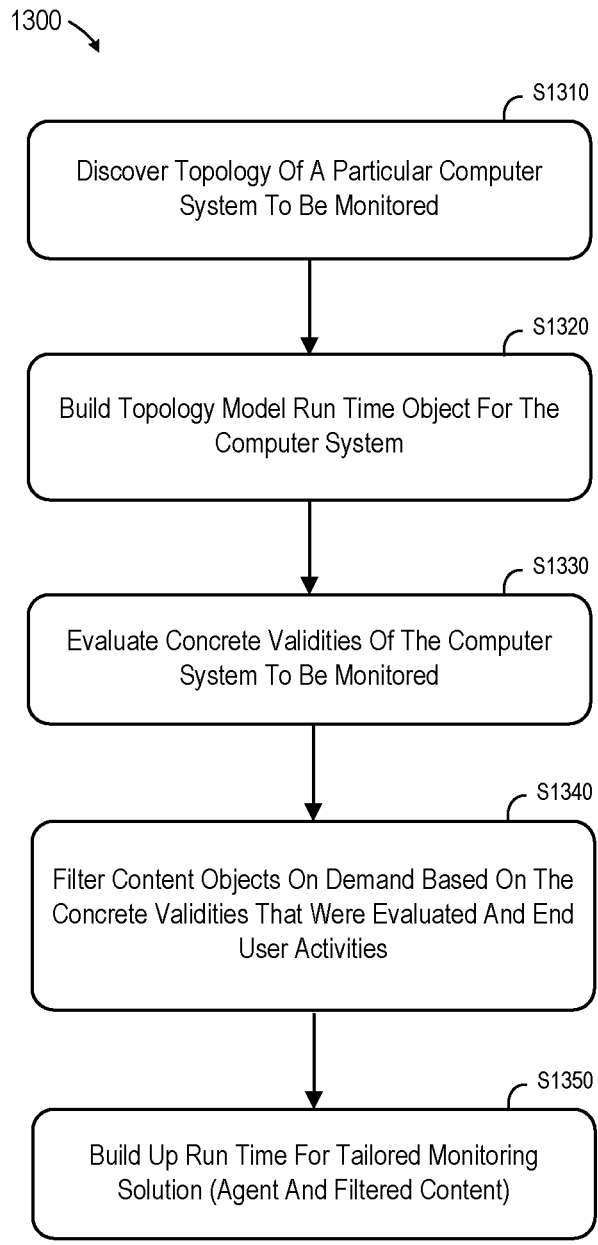
FIG. 13 is a flow diagram of a run time method according to some embodiments.

FIG. 13 is a flow diagram of a run time method 1300 that might be performed, for example, by a local agent at a computer system to be monitored at run time according to some embodiments. At S1310, the topology of the particular computer system to be monitored may be discovered. At S1320, a topology model run time object may be built for the computer system to be monitored. At S1330, concrete validities of the computer system to be monitored may be evaluated and determined. At S1340, content objects may be filtered on demand based on the concrete validities that were evaluated and end user activities. At S1350, a run time for the tailored monitoring solution may be built. For example, the agent along with the filtered content may comprise an appropriate, tailored run time for the computer system to be monitored.

Figure 14:
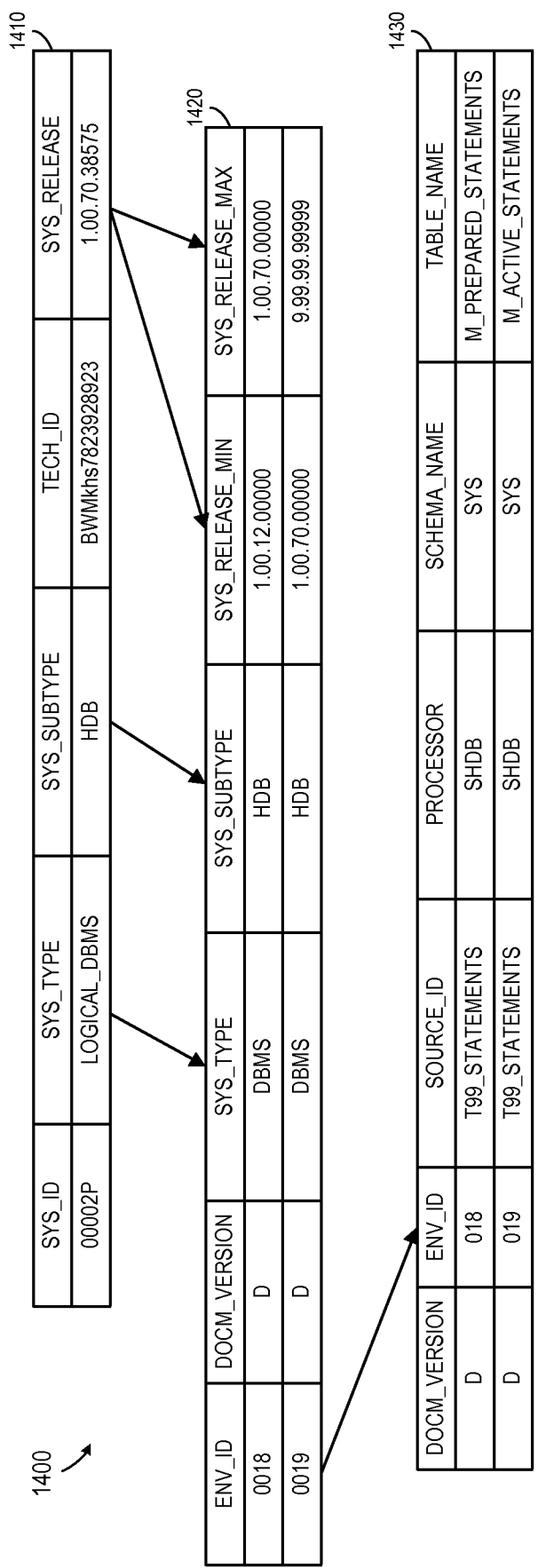
FIG. 14 illustrates exemplary relationships between content tables in accordance with some embodiments.

FIG. 14 illustrates exemplary relationships 1400 between content tables in accordance with some embodiments. In particular, the relationships 1400 are illustrated for an implementation example that shows the dependency between system topology, validities, and content objects. A first content table 1410 (e.g., a DOTM_SYS Select Entries table) associated with topology might include, for example, a system identifier, a system type, a system subtype, a technical identifier, and/or a system release identifier. Similarly, a second content table 1420 (e.g., a DOCR_ENV Select Entries table) associated with environment might include, for example, information about multiple computer systems to be monitored. For each of those computer systems, the table 1420 might include, for example, an environment identifier, a DOCM version, a system type and subtype (e.g., corresponding to the system type and subtype of the first table 1410), and minimum and maximum system release identifiers (e.g., which may be used to evaluate the system release identifier in the first table 1410). Finally, a third content table 1430 (e.g., a DORDS_TABLE Select Entries table) associated with content might include, for example, information about multiple computer systems to be monitored. For each of those computer systems, the table 1430 might include, for example, a DOCM version, an environment identifier (e.g., corresponding to the environment identifier of the second table 1420), a source identifier, a processor identifier, a schema name, and a table name.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of a system described herein may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A design time apparatus, comprising:
   a communication device to transmit information to be received by a plurality of computer systems to be monitored; and
   a design time application, coupled to the communication device, including:
      a memory storing processor-executable program code, and
      a processor to execute the processor-executable program code in order to cause the design time application to:
         create a monitoring solution agent locally executed to monitor a computer system, wherein the monitoring solution agent includes at least some of a set of monitoring solution agent content objects and a monitoring agent code portion, wherein each monitoring solution agent content object is organized by four content layers and includes infrastructure components of the computer system to be monitored, wherein the four content layers are: 1. a data source layer describing interfaces to infrastructure components of the computer system to be monitored, 2. a data provider layer having data providers mapped to interfaces in the data source layer, 3. a request layer including queries to access the data providers in the data provider layer, and 4. a user interface layer to receive results from the request layer and to establish screens and user interface elements comprising a front end to the monitoring solution, and wherein the monitoring agent code portion includes code for topology detection of the computer system to be monitored,
         assign at least one of a plurality of validities to each of the monitoring solution agent content objects at design time, wherein a validity tags each of the monitoring solution agent content objects at design time with a valid software component, a valid software component version and minimum agent version requirement needed for each monitoring solution agent object to be used at run-time, wherein the valid software component, valid software component version and minimum agent version requirement is for a run-time environmental condition for which the monitoring solution agent content object is deployed to monitor the computer system; and
         evaluate the valid software component, valid software component version and minimum agent version requirement to determine whether the monitoring solution agent content object matches the run-time environmental condition for which the monitoring solution agent content object is deployed to monitor the computer system.

2. The apparatus of claim 1, wherein a single validity is assigned multiple monitoring solution agent content objects.

3. The apparatus of claim 1, wherein a single monitoring solution agent content object is assigned to multiple validities.

4. The apparatus of claim 1, wherein monitoring solution agent content objects or validities are associated with at least one of: (i) hardware, (ii) virtualization, (iii) an operating system, (iv) a database, and (v) an application.

5. The apparatus of claim 1, wherein at least some monitoring solution agent content objects include at least one of: (i) navigation information, (ii) user interface information, (iii) personalization information, (iv) a data provider, (v) a data source, (vi) mapping data, (vii) request data, (viii) aggregation data, (ix) thresholds, (x) calculations, (xi) collector information, (xii) database metadata, (xiii) operating system metadata, and (xiv) platform specific metadata.

6. The apparatus of claim 1, wherein the monitoring solution agent code portion makes use of a content manager to tailor and deploy the monitoring solution agent content portion.

7. The apparatus of claim 1, wherein at least one of the computer systems is associated with at least one of: (i) a database system, (ii) an operating system, (iii) a virtualization layer, (iv) a cloud service, (v) an infrastructure as a service platform, (vi) a real-time analytics, interactive data exploration and application platform, (vii) a real time data acquisition platform, (viii) a transactional, analytical, online application, (ix) a customer mobile application, (xii) a business object suite, and (xiii) a business objects data service.

8. A non-transitory, computer-readable medium storing program code, the program code executable by a processor of a design time application to cause the design time application to, for a plurality of computer systems to be monitored:
   create a monitoring solution agent locally executed to monitor a computer system, wherein the monitoring solution agent includes at least some of a set of monitoring solution agent content objects and a monitoring agent code portion, wherein each monitoring solution agent content object is organized by four content layers and includes infrastructure components of the computer system to be monitored, wherein the four content layers are: 1. a data source layer describing interfaces to infrastructure components of the computer system to be monitored, 2. a data provider layer having data providers mapped to interfaces in the data source layer, 3. a request layer including queries to access the data providers in the data provider layer, and 4. a user interface layer to receive results from the request layer and to establish screens and user interface elements comprising a front end to the monitoring solution, and wherein the monitoring agent code portion includes code for topology detection of the computer system to be monitored;
   assign at least one of a plurality of validities to each of the monitoring solution agent content objects at design time, wherein a validity tags each of the monitoring solution agent content objects at design time with a valid software component, a valid software component version and minimum agent version requirement needed for each monitoring solution agent content object to be used at run-time, wherein the valid software component, valid software component version and minimum agent version requirement is for a run-time environmental condition for which the monitoring solution agent content object is deployed to monitor the computer system; and evaluate the valid software component, valid software component version and minimum agent version requirement to determine whether the monitoring solution agent content object matches the run-time environmental condition for which the monitoring solution agent content object is deployed to monitor the computer system.

9. The medium of claim 8, wherein a single validity is assigned multiple monitoring solution agent content objects.

10. The medium of claim 8, wherein a single monitoring solution agent content object is assigned to multiple validities.

11. The medium of claim 8, wherein monitoring solution agent content objects or validities are associated with at least one of: (i) hardware, (ii) virtualization, (iii) an operating system, (iv) a database, and (v) an application.

12. A run time apparatus associated with a computer system to be monitored, comprising:

a communication device to receive monitoring solution agent content objects, wherein monitoring solution agent content objects include infrastructure components of a computer system to be monitored; and a run time application, coupled to the communication device, including:

a memory storing processor-executable program code, and a processor to execute the processor-executable program code in order to cause the run time application to:

receive the monitoring solution agent content objects organized by four content layers including 1. a data source layer describing interfaces to infrastructure components of the computer system to be monitored, 2. a data provider layer having data providers mapped to interfaces in the data source layer, 3. a request layer including queries to access the data providers in the data provider layer, and 4. a user interface layer to receive results from the request layer and to establish screens and user interface elements comprising a front end to the monitoring solution, discover a local topology of the computer system to be monitored, evaluate concrete validities of the computer system to be monitored to determine whether the monitoring solution agent content object matches a run-time environmental condition for which the monitoring solution agent content object is deployed to monitor the computer system, wherein a validity tags each of the monitoring solution agent content objects at design time with a valid software component, a valid software component version and minimum agent version requirement needed for each monitoring solution agent content object to be used at runtime, wherein the valid software component, valid software component version and minimum agent version requirement is for the run-time environmental condition for which the monitoring solution agent content object is deployed, filter content objects on demand based on the concrete validities that were evaluated and end user activities, and build up run time for tailored monitoring solution.

13. The apparatus of claim 12, wherein the processor is further to build a topology model run time object for the computer system to be monitored.

14. The apparatus of claim 13, wherein the topology model is associated with a change in at least one of: (i) hardware, (ii) virtualization, (iii) an operating system, (iv) a database, and (v) an application.

15. A non-transitory, computer-readable medium storing program code, the program code executable by a processor of a run time application to cause the run time application to:

receive monitoring solution agent content objects organized by four content layers including 1. a data source layer describing interfaces to infrastructure components of the computer system to be monitored, 2. a data provider layer having data providers mapped to interfaces in the data source layer, 3. a request layer including queries to access the data providers in the data provider layer, and 4. a user interface layer to receive results from the request layer and to establish screens and user interface elements comprising a front end to the monitoring solution, wherein monitoring solution agent content objects include infrastructure components of a computer system to be monitored;

discover a local topology of the computer system to be monitored;

evaluate concrete validities of the computer system to be monitored to determine whether the monitoring solution agent content object matches a run-time environmental condition for which the monitoring solution agent content object is deployed to monitor the computer system, wherein a validity tags each of the monitoring solution agent content objects at design time with a valid software component, a valid software component version and minimum agent version requirement, wherein the valid software component, valid software component version and minimum agent version requirement is for the run-time environmental condition for which the monitoring solution agent content object is deployed to monitor the computer system;

filter content objects on demand based on the concrete validities that were evaluated and end user activities; and build up run time for tailored monitoring solution.

16. The medium of claim 15, wherein the processor is further to build a topology model run time object for the computer system to be monitored.

17. The medium of claim 15, wherein the topology model is associated with a change in at least one of: (i) hardware, (ii) virtualization, (iii) an operating system, (iv) a database, and (v) an application.

* * * * *